United States Patent
Mathrubutham et al.

(10) Patent No.: US 7,366,801 B2
(45) Date of Patent: Apr. 29, 2008

(54) METHOD FOR BUFFERING WORK REQUESTS

(75) Inventors: Ramani Mathrubutham, Milpitas, CA (US); Adwait Sathye, Sunnyvale, CA (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 10/768,581

(22) Filed: Jan. 30, 2004

(65) Prior Publication Data

US 2005/0172054 A1  Aug. 4, 2005

(51) Int. Cl.
*G06F 3/00* (2006.01)

(52) U.S. Cl. .......................... 710/52; 710/57; 710/56; 711/3; 711/154

(58) Field of Classification Search .......... 710/57, 710/56; 711/3
See application file for complete search history.

(56) References Cited

U.S. PATENT DOCUMENTS

| | | | |
|---|---|---|---|
| 4,703,481 A | 10/1987 | Fremont | |
| 5,410,672 A | 4/1995 | Sodek, Jr. et al. | |
| 5,440,691 A | 8/1995 | Carrafiello et al. | |
| 5,566,337 A | 10/1996 | Szymanski et al. | |
| 5,692,156 A | 11/1997 | Bahls et al. | |
| 5,712,971 A | 1/1998 | Stanfill et al. | |
| 5,870,605 A | 2/1999 | Bracho et al. | |
| 5,938,775 A | 8/1999 | Damani et al. | |
| 6,014,673 A | 1/2000 | Davis et al. | |
| 6,044,419 A | 3/2000 | Hayek et al. | |
| 6,070,202 A * | 5/2000 | Minkoff et al. | 710/56 |
| 6,182,086 B1 | 1/2001 | Lomet et al. | |
| 6,285,601 B1 | 9/2001 | Smith | |
| 6,292,856 B1 * | 9/2001 | Marcotte | 710/39 |
| 6,308,237 B1 | 10/2001 | Strongin et al. | |
| 6,321,234 B1 | 11/2001 | Debrunner | |
| 6,336,119 B1 | 1/2002 | Banavar et al. | |
| 6,351,780 B1 | 2/2002 | Ecclesine | |
| 6,493,826 B1 | 12/2002 | Schofield et al. | |

(Continued)

FOREIGN PATENT DOCUMENTS

GB    2354913 A    4/2001

(Continued)

OTHER PUBLICATIONS

U.S. Patent Application entitled "*Method, System, and Program for Facilitating Flow Control*," by R. Mathrubutham, A.B. Sathye and C. Zou, filed on Jan. 30, 2004.

(Continued)

*Primary Examiner*—Alford Kindred
*Assistant Examiner*—Ernest Unelus
(74) *Attorney, Agent, or Firm*—Konrad Raynes & Victor LLP; Janaki K. Davda

(57) ABSTRACT

Disclosed is a technique for buffering work requests. It is determined that a work request is about to be placed into an in-memory structure. When the in-memory structure is not capable of storing the work request, a work request ordering identifier for the work request is stored into an overflow structure. When the in-memory structure is capable of storing the work request, a recovery stub is generated for the work request ordering identifier, and the recovery stub is stored into the in-memory structure.

7 Claims, 13 Drawing Sheets

U.S. PATENT DOCUMENTS

| | | | |
|---|---|---|---|
| 6,839,817 B2 * | 1/2005 | Hyde et al. | 711/154 |
| 6,970,921 B1 * | 11/2005 | Wang et al. | 709/220 |
| 7,130,957 B2 * | 10/2006 | Rao | 711/3 |
| 7,210,001 B2 * | 4/2007 | Frey et al. | 711/100 |
| 2002/0194244 A1 | 12/2002 | Raventos | |

FOREIGN PATENT DOCUMENTS

| | | | |
|---|---|---|---|
| JP | 2000332792 A | 11/2000 | |
| SU | 0491980 T | 3/1974 | |

OTHER PUBLICATIONS

U.S. Patent Application entitled "Method, System, and Program for System Recovery," by P. Ahuja, R. Mathrubutham, A.B. Sathye and C. Zou, filed on Jan. 30, 2004.

* cited by examiner

METHOD FOR BUFFERING WORK REQUESTS

BACKGROUND OF THE INVENTION

1. Field of the Invention

The present invention is related to buffering work requests.

2. Description of the Related Art

The term "workflow" may be used to describe tasks and data for business processes. The data, for example, may relate to organizations or people involved in a business process and required input and output information for the business process. A workflow automation product allows creation of a workflow model to manage business processes. A workflow engine is a component in a workflow automation program that understands the tasks of each business process in the workflow and determines whether the business process is ready to move to the next task.

A publish-subscribe pattern is a common pattern in distributed applications and describes a pattern in which a publisher (e.g., an application program) generates work requests to be processed by one or more subscribers (e.g., business processes), for example, as part of a work flow. The subscribers that receive the work requests are those that are interested in the work requests and that have registered with the publisher to receive the work requests of interest.

A work request may be described as a business object request because the work request is processed by a business process. For example, a work request may provide data (e.g., employee name and social security number) and a description of what is to be done (e.g., creating, deleting, or updating an entry in a data store).

The publisher may dispatch work requests to an intermediary application program that stores the work requests in queues for each subscriber, and each subscriber retrieves the work requests from an associated queue. Since the intermediary application program holds work requests in each queue until the work requests are retrieved by subscribers, sometimes, a very slow subscriber may not retrieve work requests at a fast rate, leaving many work requests in the queue. This may lead to the queue running out of entries for storing new work requests for that subscriber.

That is, one problem with the publisher-subscriber pattern is that the delivery of work requests from the publisher may cause a queue to overflow when a subscriber is slow to retrieve work requests from the queue.

Thus, there is a need in the art for an improved technique for processing work requests for a system using a publish-subscribe pattern.

SUMMARY OF THE INVENTION

Provided are a method, system, and program for buffering work requests. It is determined that a work request is about to be placed into an in-memory structure. When the in-memory structure is not capable of storing the work request, a work request ordering identifier for the work request is stored into an overflow structure. When the in-memory structure is capable of storing the work request, a recovery stub is generated for the work request ordering identifier, and the recovery stub is stored into the in-memory structure.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention buffer work requests for one or more subscribers that are slow to retrieve work requests from their in-memory structures (e.g., queues) that hold work requests. When an in-memory structure becomes full and work requests continue to be sent to the subscriber, the subscriber is said to be in an overflow state (i.e., the in-memory structure for the subscriber may overflow). Thus, in cases in which it is not possible to send a communication to the publisher to stop sending work requests or cases in which some subscribers wish to receive work requests when other subscribers are in an overflow state, each subscriber may be configured such that, even if the subscriber reaches an overflow state, work requests are still delivered to the subscribers that are not in overflow states without interruption. Then, the work requests for the subscribers in the overflow state are buffered and sent to the subscribers when the subscribers are able to process more work requests.

Figure 1A:
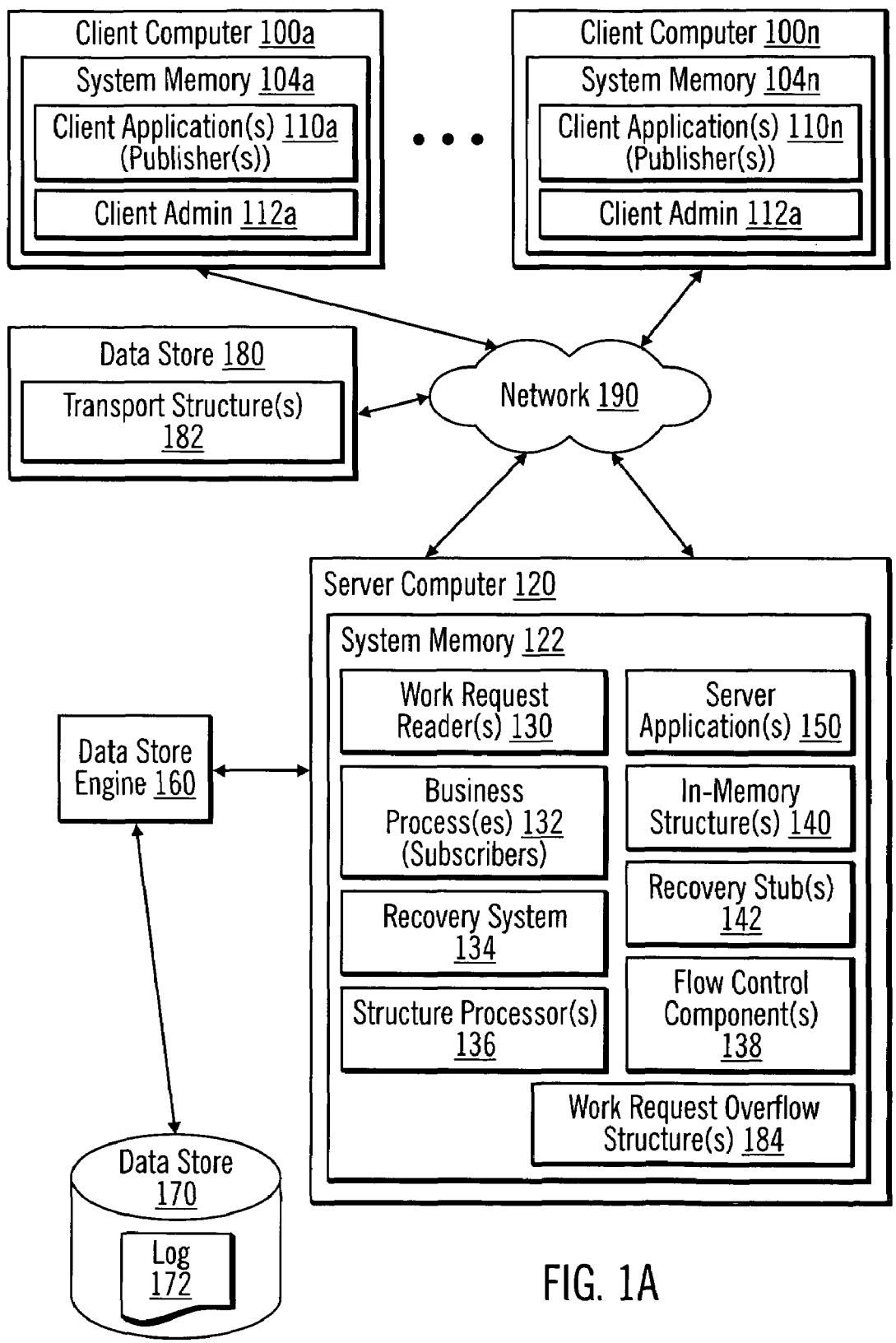
FIG. 1A illustrates, in a block diagram, a computing environment in accordance with certain implementations of the invention.

FIG. 1A illustrates, in a block diagram, a computing environment in accordance with certain implementations of the invention. One or more client computers 100a . . . 100n are connected via a network 190 to a server computer 120. For ease of reference, the designations of "a" and "n" after reference numbers (e.g., 100a . . . 110n) are used to indicate one or more elements (e.g., client computers). The client computers 100a . . . 100n may comprise any computing device known in the art, such as a server, mainframe, workstation, personal computer, hand held computer, laptop telephony device, network appliance, etc. The network 190 may comprise any type of network, such as, for example, a Storage Area Network (SAN), a Source Area Network (LAN), Wide Area Network (WAN), the Internet, an Intranet, etc.

Each client computer 100a . . . 100n includes system memory 104a . . . 104n, respectively, which may be implemented in volatile and/or non-volatile devices. One or more client applications 110a . . . 110n and client admin applications 112a . . . 112n may execute in the system memory 104a . . . 104n, respectively. The client applications 110a . . . 110n may generate and submit work requests in the form of messages to the server computer 120 for execution. The client admin applications 112a . . . 112n perform administrative functions.

The server computer 120 includes system memory 122, which may be implemented in volatile and/or non-volatile devices. A data store engine 160 is connected to the server computer 120 and to data store 170.

One or more work request readers 130, one or more business processes 132, a recovery system 134, one or more structure processors 136, and one or more flow control components 138 execute in the system memory 122. Additionally, one or more server applications 150 execute in system memory 122. One or more in-memory structures 140 (e.g., in-memory queues) may be stored in system memory 122. In certain implementations of the invention, there is one in-memory structure 140 for each business process 132, and one structure processor 136 for each in-memory structure 140. One or more work request overflow structures ("overflow structures") 184 may also be stored in system memory 122 for each business process 132.

One or more transport structures 182 (e.g., queues) may be stored in a data store 180 connected to network 190. In certain implementations of the invention, there is one transport structure 182 associated with each business process 132. The transport structure 182 may be, for example, a Message Queue ("MQ") available from International Business Machines Corporation, a Common Object Request Broker Architecture (CORBA) structure, or a JAVA® Message Service (JMS) structure. In certain implementations of the invention, the transport structure 182 may be persistent.

In certain implementations of the invention, such as in workflow systems, the client applications 110a . . . 110n may be described as "publishers", while the business processes 132 may be described as "subscribers".

The work requests may be stored in both in-memory structures 140 and in transport structures 182 corresponding to the business processes 132 that are to process the work requests. The work request reader 130 retrieves a work request from a transport structure 182 associated with a business process 132 that is to execute the work request, and forwards the work request to the appropriate business process 132.

During recovery, recovery stubs 142 are generated in system memory 122 by retrieving some data from log 172. In certain implementations of the invention, the term "recovery stubs" 142 may be used to represent a portion of a work request. In certain implementations of the invention, a recovery stub includes a work request key that links together work requests (e.g., a social security number for data about an individual), a work request ordering identifier that indicates the order in which the work request corresponding to the recovery stub was received by the work request reader 130, and a structure identifier that provides access to the complete work request stored in one or more transport structures 182. In certain implementations, the work request ordering identifier is a sequence number assigned to the work request. The log 172 provides information about work requests (e.g., a work request key, a work request ordering identifier, and a structure identifier) and the state of the work requests (e.g., whether a work request was in progress when a system (e.g., server computer 120) failure occurred).

Although a single data store 170 is illustrated for ease of understanding, data in data store 170 may be stored in multiple data stores at server computer 120 and/or other computers connected to server computer 120.

The data store 170 may comprise an array of storage devices, such as Direct Access Storage Devices (DASDs), Just a Bunch of Disks (JBOD), Redundant Array of Independent Disks (RAID), virtualization device, etc.

Figure 1B:
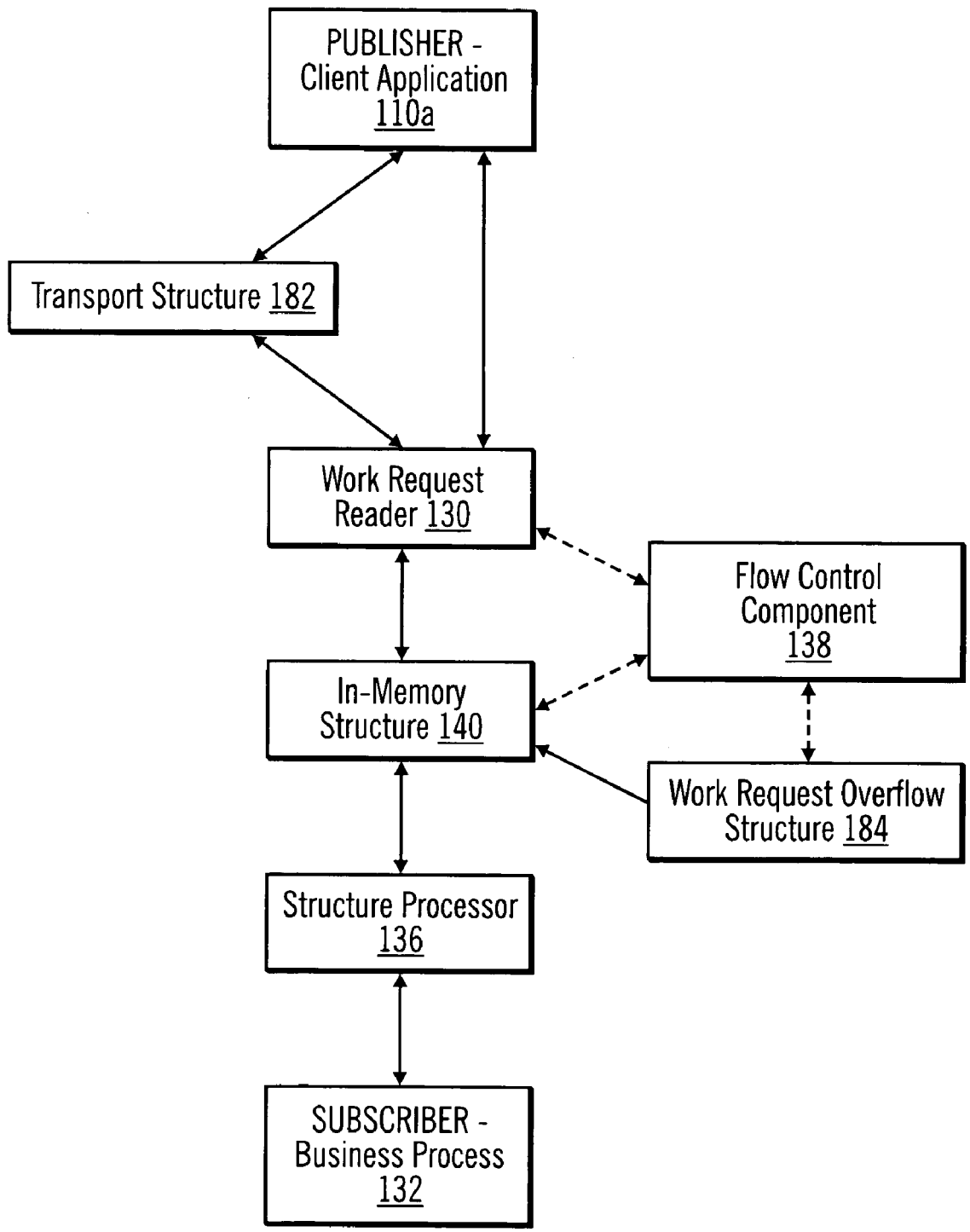
FIG. 1B illustrates, in a block diagram, further details of a computing environment in accordance with certain implementations of the invention.

FIG. 1B illustrates, in a block diagram, further details of a computing environment in accordance with certain implementations of the invention. In certain implementations, one client application 130 ("publisher"), one transport structure 182, one work request reader 130, one in-memory structure 140, one structure processor 136, and one business process 132 ("subscriber") are associated with each other. In certain alternative implementations, a business process 132 may receive work requests from multiple client applications 110.

In the illustration of FIG. 1B, the client application 110a produces work requests that are destined for the business process 132. The client application 110a may also communicate with the work request reader 130, for example, for administrative functions. In particular, the client application 110a sends work requests to the server computer 120 by storing the work requests in transport structures 182, where one transport structure 182 corresponds to one business process 132. The work request reader 130 retrieves work requests from the transport structure 182 and stores them in the in-memory structure 140 for the business process 132. If the in-memory structure is full, the work request reader 130 stores the work request in a work request overflow structure 184. The structure processor 136 retrieves work requests from the in-memory structure 140 and forwards the work requests to the business process 132 for processing. Also, as work requests are retrieved from the in-memory structure 140, the flow control component 138 stores the work requests from the work request overflow structure 184 into the in-memory structure 140. After completing a work request, a business process 132 removes the work request from the appropriate transport structure 182 and performs other processing to clean up the transport structure 182. Additionally, a flow control component 138 monitors work requests being transferred by the work request reader 130 into the in-memory structure 140 and work requests removed from the in-memory structure 140. The flow control component 138 may assist in controlling the flow of work requests.

Figure 1C:
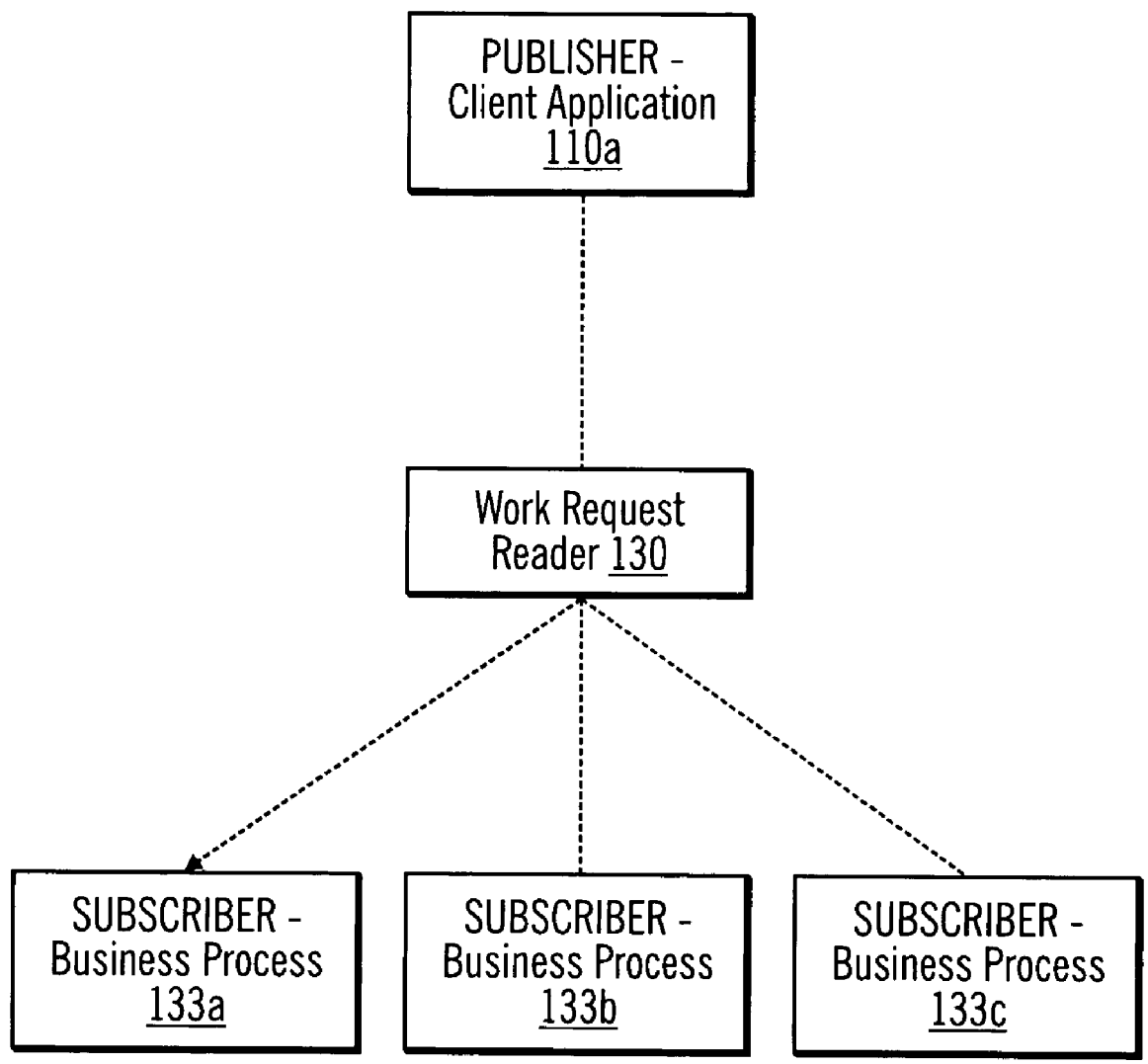
FIG. 1C illustrates, in a block diagram, yet further details of a computing environment in accordance with certain implementations of the invention.

FIG. 1C illustrates, in a block diagram, yet further details of a computing environment in accordance with certain implementations of the invention. In particular, in FIG. 1C, a single client application 110a may send work requests that are processed by a single work request reader 130 for multiple business processes 133a, 133b, 133c.

Figure 2A:
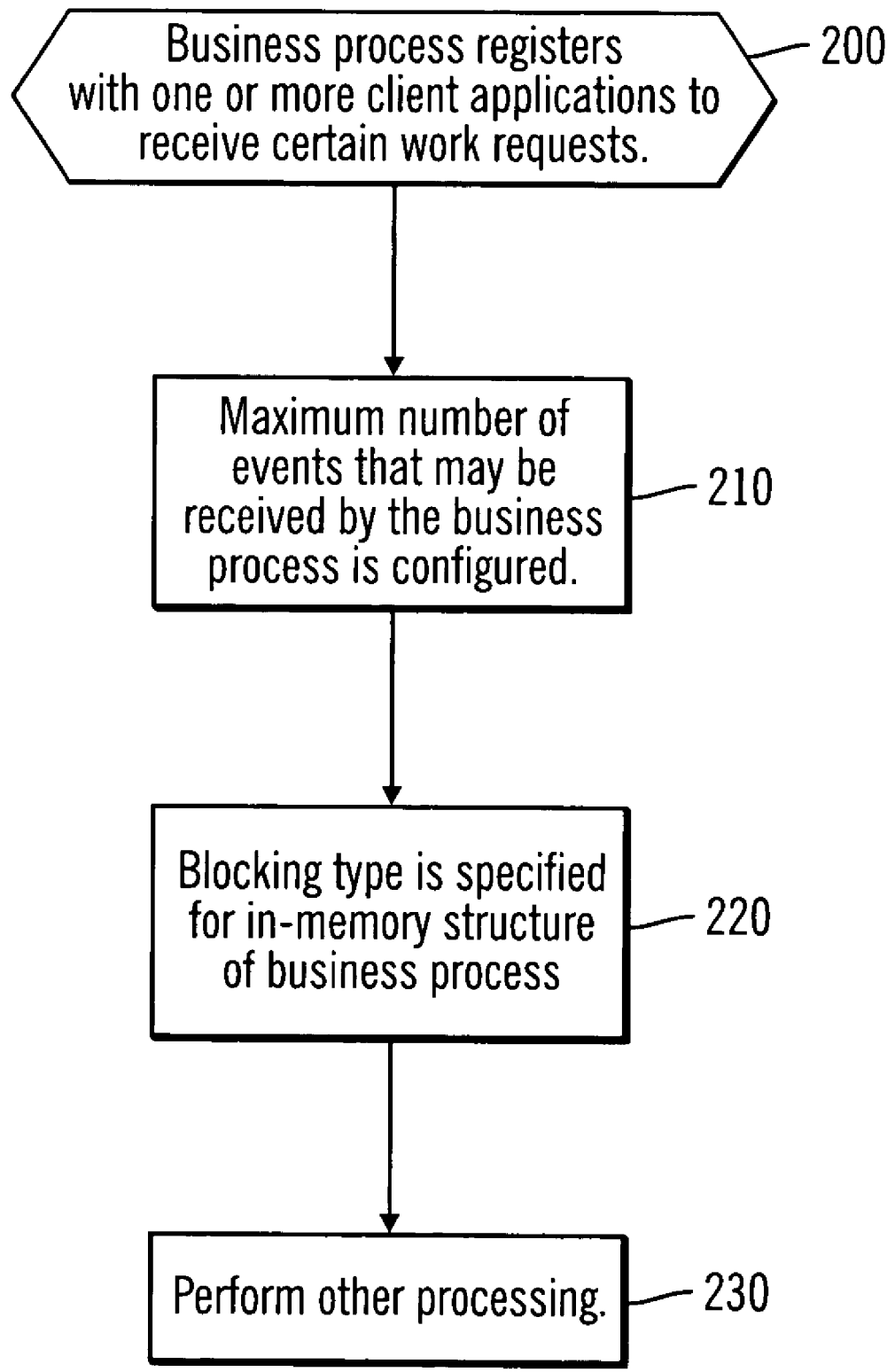
FIG. 2A illustrates logic implemented in a business process in accordance with certain implementations of the invention.

FIG. 2A illustrates logic implemented in a business process 132 in accordance with certain implementations of the invention. Control begins at block 200 with the business process 132 registering with one or more client applications 110a . . . 110n for certain types of work requests. In certain implementations, each work request includes a type field. Then, when a work request is generated by a client application 110a . . . 110n, the type of the work request is determined, the business processes 132 that registered for that type of work request are determined, and the work request is sent, by the client application 110a . . . 110n, to the transport structures 182 for the determined business processes 132. In alternative implementations, work requests and business processes 132 may be associated using other techniques (e.g., all business processes 132 receive all work requests and process the desired ones).

In block 210, the business process 132 is configured for a maximum number of work requests that may be stored by the business process at any given time, and this maximum number is also referred to as a "maximum limit." In certain implementations, a user, such as a system administrator, sets the maximum limit. In certain implementations, the maximum limit is equivalent to the number of work requests that may be stored in an in-memory structure 140 for the business process 132. In block 220, a blocking type is specified for the in-memory structure 140 for the business process 132. In block 230, other processing may occur.

In certain implementations, a blocking type may be associated with an in-memory structure 140 for a business process 132. The blocking type is set to a first value (e.g., "blocking") to indicate that a client application 110a . . . 110n should be blocked from sending additional work requests when a maximum limit is reached for a business process. The blocking type is set to a second value (e.g., "non-blocking") to indicate that work requests are to be stored in a work request overflow structure 184 for a business process when a maximum limit is reached for that business process.

Figure 2B:
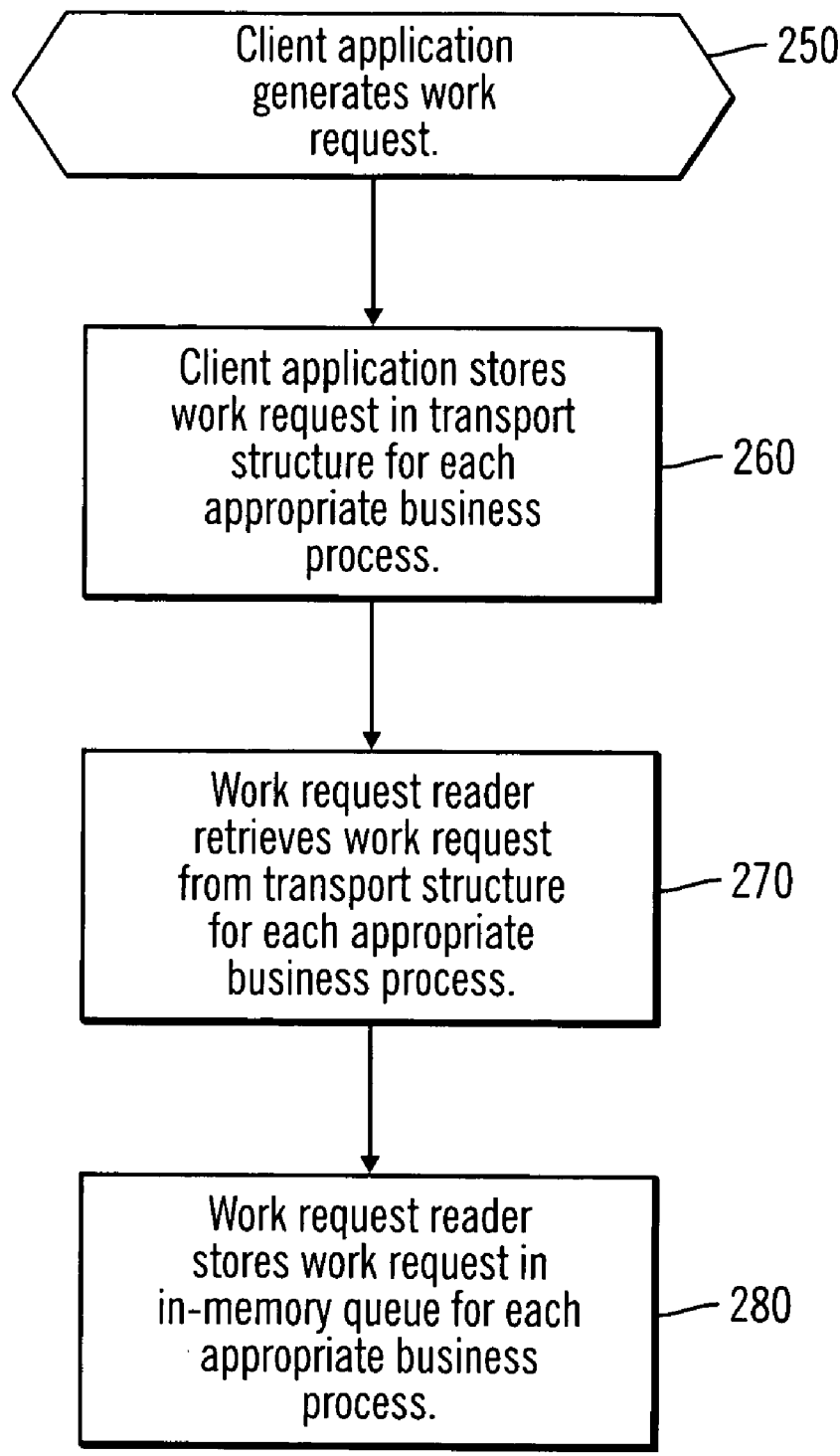
FIG. 2B illustrates logic implemented for moving work requests in accordance with certain implementations of the invention.

FIG. 2B illustrates logic implemented for moving work requests in accordance with certain implementations of the invention. Control begins in block 250 with a client application (e.g., 110a) generating a work request. In block 260, the client application 110a . . . 110n stores the work request in a transport structure 182 for the associated business process 132. If more than one business process 132 is to process the same work request, then the client application 110a . . . 110n stores the work request in the transport structure 182 for each appropriate business process 132. In block 270, the work request reader 130 retrieves the work request from the transport structure 182 for the associated business process. In block 280, the work request reader 130 stores the work request in an in-memory structure 140 for the associated business process 132.

Figure 3A:
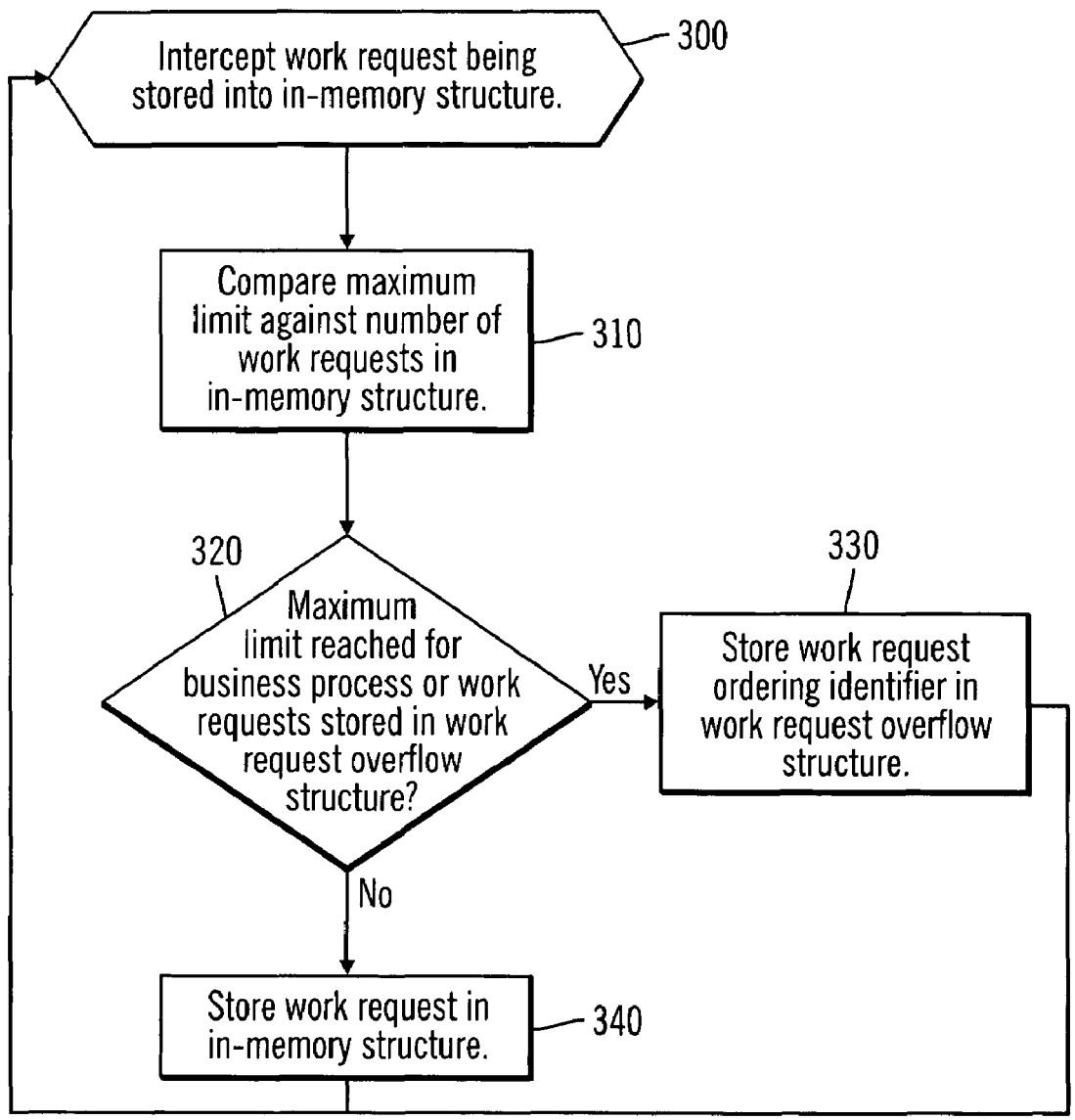
FIG. 3A illustrates logic implemented when a work request is to be stored in an in-memory structure in accordance with certain implementations of the invention.

FIG. 3A illustrates logic implemented when a work request is to be stored in an in-memory structure 140 in accordance with certain implementations of the invention. Control begins in block 300 with the flow control component 138 "intercepting" a work request transferred by the work request reader 130 to the in-memory structure 140. The term "intercepting" describes monitoring by the flow control component 138 and detecting that the work request is being transferred into or out of an in-memory structure 140. The processing of block 300 may occur periodically. In certain implementations, the work request reader 130 registers with the flow control component 138 so that the flow control component 138 can monitor work requests being transferred by the work request reader 130.

In block 310, the flow control component 138 compares the maximum limit against the number of work requests in the in-memory structure 140. In block 320, if the maximum limit has been reached or work requests are stored in work request overflow structure 184, processing continues to block 330, otherwise, processing continues to block 340. Thus, a work request is stored in the overflow structure 184 when the in-memory structure 140 is not capable of storing the work request. The in-memory structure 140 is not capable of storing work requests when the maximum limit has been reached or work requests remain in the overflow structure 184. That is, in certain implementations, work requests are not stored in the in-memory structure 140 until all work requests in the work request overflow structure 184 have been moved into the in-memory structure 140.

In block 330, the flow control component 138 stores a work request ordering identifier into a work request overflow structure 184 for the business process for which the work request was intercepted. In block 340, the work request reader 130 stores the work request in the in-memory structure 140.

For example, in certain implementations, if the maximum limit is 10 work requests, when the $11^{th}$ work request is intercepted by the flow control component 138, the flow control component 138 stores the $11^{th}$ work request in a work request overflow structure 184.

Thus, in certain implementations, as work requests beyond the maximum limit are sent by one or more client applications 110a . . . 110n to a business process 132, work requests for the business process 132 are stored in a work request overflow structure 184. Thus, if one business process 132 reaches its maximum limit, then the other business processes 132 are not impacted.

Figure 3B:
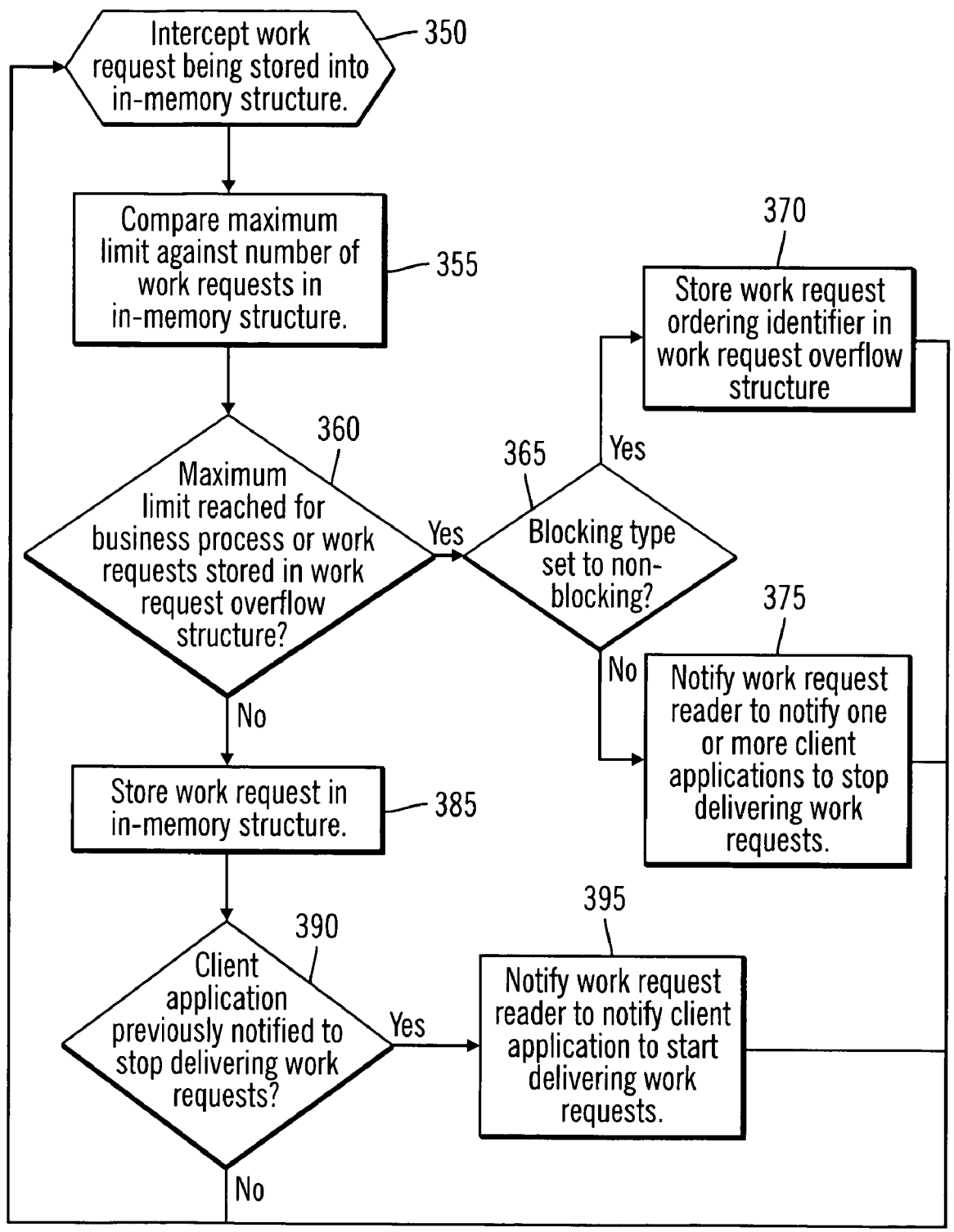
FIG. 3B illustrates logic implemented when a work request is to be stored in an in-memory structure in accordance with certain alternative implementations of the invention.

FIG. 3B illustrates logic implemented when a work request is to be stored in an in-memory structure 140 in accordance with certain alternative implementations of the invention. Control begins in block 350 with the flow control component 138 "intercepting" a work request transferred by the work request reader 130 to the in-memory structure 140. In block 355, the flow control component 138 compares the maximum limit against the number of work requests in the in-memory structure 140. In block 360, if the maximum limit has been reached or work requests are stored in work request overflow structure 184, processing continues to block 365, otherwise, processing continues to block 385.

In block 365, the flow control component determines whether a blocking type (e.g., flag) is set to non-blocking. If so processing continues to block 370, otherwise, processing continues to block 375. In block 370, the flow control component 138 stores a work request ordering identifier into a work request overflow structure 184 for the business process for which the work request was intercepted. In block 375, the flow control component 138 notifies the work flow mover 130 to notify the client application 110a . . . 110n that sent the intercepted work request to stop sending work requests. From block 375, processing loops back to block 350. In certain implementations, a notification indicator (e.g., flag) may be set for the business processes. In this case, in block 375, the notification is sent only if the notification indicator is set to indicate that a notification is to be sent.

In block 385, the work request reader 130 stores the work request in the in-memory structure 140. In block 390, if the flow control component 138 determines that the client application 110a . . . 110n was previously notified to stop delivering work requests, processing continues to block 395, otherwise, processing loops back to block 350. In block 395, the flow control component 138 notifies the work flow mover 130 to notify one or more client applications 110a ... 110n that were previously notified to stop sending work requests to start sending work requests. Then, processing loops back to block 350.

Thus, in certain implementations, as work requests beyond the maximum limit set for a business process 132 are received for that business process 132, if a blocking type for the in-memory structure 140 associated with the business process is set to "non-blocking," work requests are stored in work request overflow structures 184.

Figure 4A:
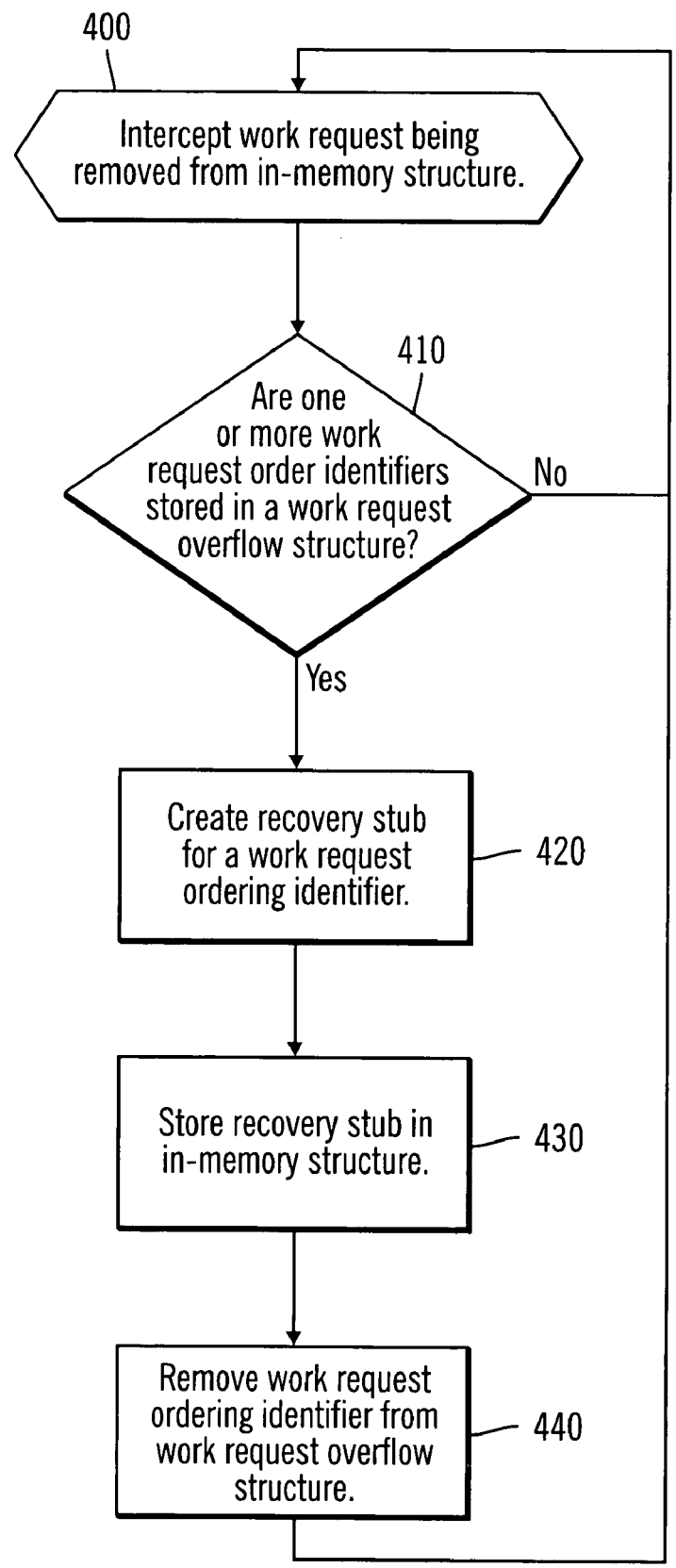
FIG. 4A illustrates logic implemented when a work request is removed from an in-memory structure in accordance with certain implementations of the invention.

FIG. 4A illustrates logic implemented when a work request is removed from an in-memory structure 140 in accordance with certain implementations of the invention. Control begins at block 400 with the flow control component 138 intercepting a work request being removed from in-memory structure 140. In block 410, if the flow control component 138 determines that there are one or more work request ordering identifiers in a work request overflow structure 184, processing continues to block 420, otherwise, processing loops back to block 400. In block 420, the flow control component 138 creates a recovery stub for a work request ordering identifier in the work request overflow structure 132. In block 430, the flow control component 138 stores the recovery stub 142 in the in-memory structure 140. In block 440, the flow control component 132 removes the work request ordering identifier from the work request overflow structure 184.

Figure 4B:
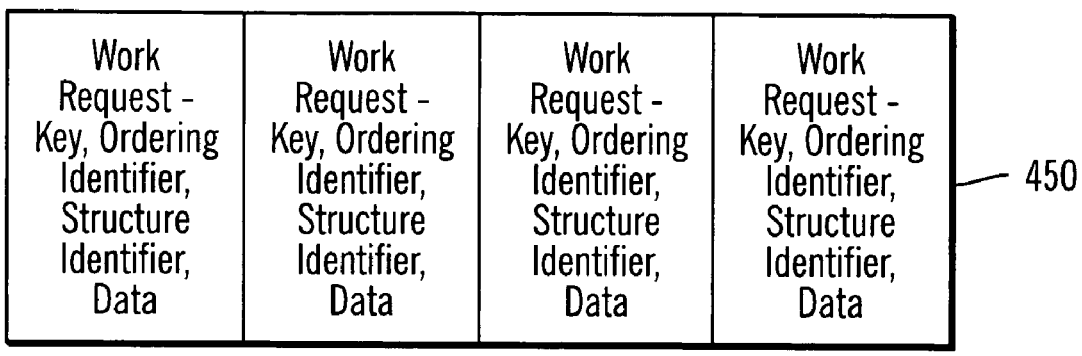
FIGS. 4B, 4C, and 4D illustrate structures in accordance with certain implementations of the invention.
Figure 4C:
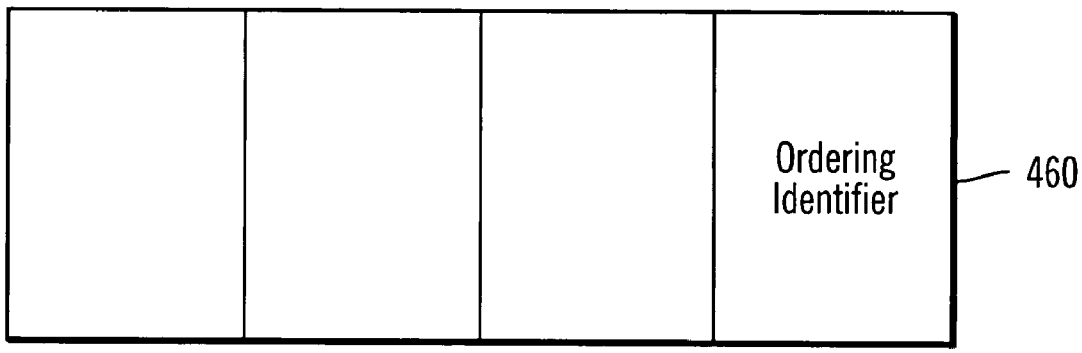
Figure 4D:
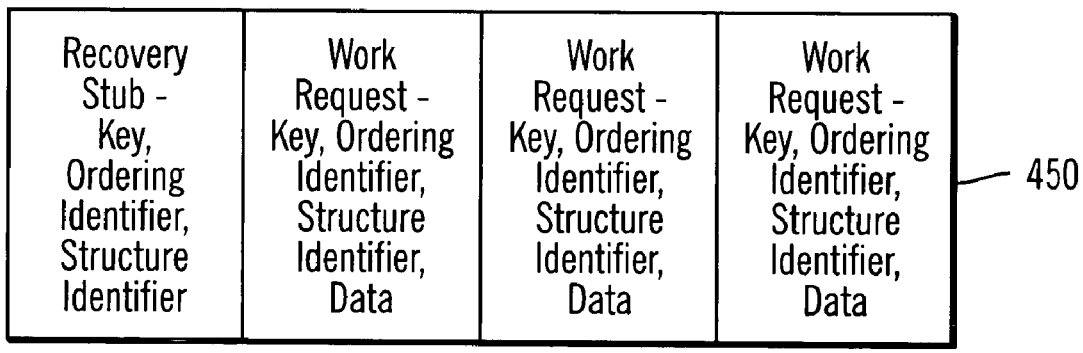

FIGS. 4B, 4C, and 4D illustrate structures 450, 460, and 470 in accordance with certain implementations of the invention. FIG. 4B illustrates an in-memory structure 450 for a business process 132. The in-memory structure 450 contains four work requests. Each work request includes a work request key that links together work requests (e.g., a social security number for data about an individual), a work request ordering identifier that indicates the order in which the work request was received by the work request reader 130, a structure identifier that provides access to the work request stored in one or more transport structures 182, and data. In this example, in-memory structure 450 is full. When a fifth work request is received, a work request ordering identifier is stored for the work request in a work request overflow structure 460, illustrated in FIG. 4C.

FIG. 4D illustrates in-memory structure 450 for the business process 132 that includes a recovery stub. After a work request has been removed from the in-memory structure 450, a recovery stub 142, generated from the work request ordering identifier in work request overflow structure 460, is stored in the in-memory structure 450. The recovery stub includes a work request key, a work request ordering identifier, and a structure identifier. In certain implementations, the recovery stubs 142 do not include data, while work requests do include data.

Figure 5:
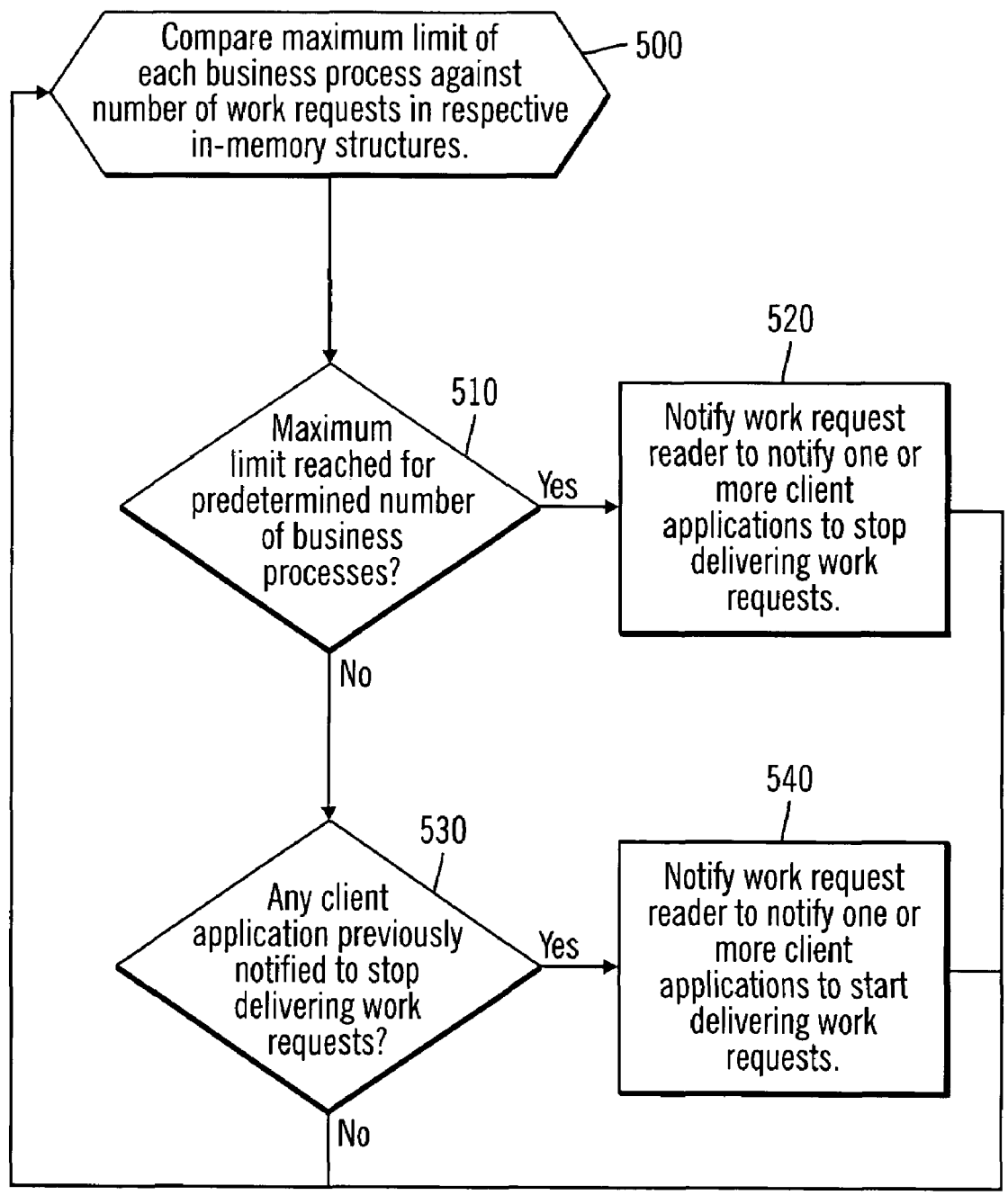
FIG. 5 illustrates logic implemented in a flow control component in accordance with certain implementations of the invention.

FIG. 5 illustrates logic implemented in a flow control component 138 in accordance with certain implementations of the invention. Control begins in block 500 with the flow control component 138 comparing the maximum limit of each business process 132 against the number of work requests in the respective in-memory structures 140. The processing of block 500 may occur periodically. In block 510, if the maximum limit has been reached for a predetermined number of business processes 132, processing continues to block 520, otherwise, processing continues to block 530. In certain implementations, the predetermined number is equivalent to all of the business processes 132.

In block 520, the flow control component 138 notifies the work flow mover 130 to notify one or more client applications 110a ... 110n to stop sending work requests. From block 520, processing loops back to block 500. In certain implementations, the work flow mover 130 is associated with one or more client applications 110a ... 110n, and the notification is sent to these client applications 110a ... 110n. In certain implementations, a notification indicator may be set for the business processes. In this case, in block 520, the notification is sent only if the notification indicator is set to indicate that a notification is to be sent.

In block 530, if the flow control component 138 determines that any client application 110a ... 110n was previously notified to stop delivering work requests, processing continues to block 550, otherwise, processing loops back to block 500. In block 550, the flow control component 138 notifies the work flow mover 130 to notify one or more client applications 110a ... 110n that were previously notified to stop sending work requests to start sending work requests. Then, processing loops back to block 500.

Thus, in certain implementations, if a maximum limit is reached for each of a predetermined number of business processes 132, one or more client applications 110a ... 110n are notified to stop sending work requests.

Figure 6:
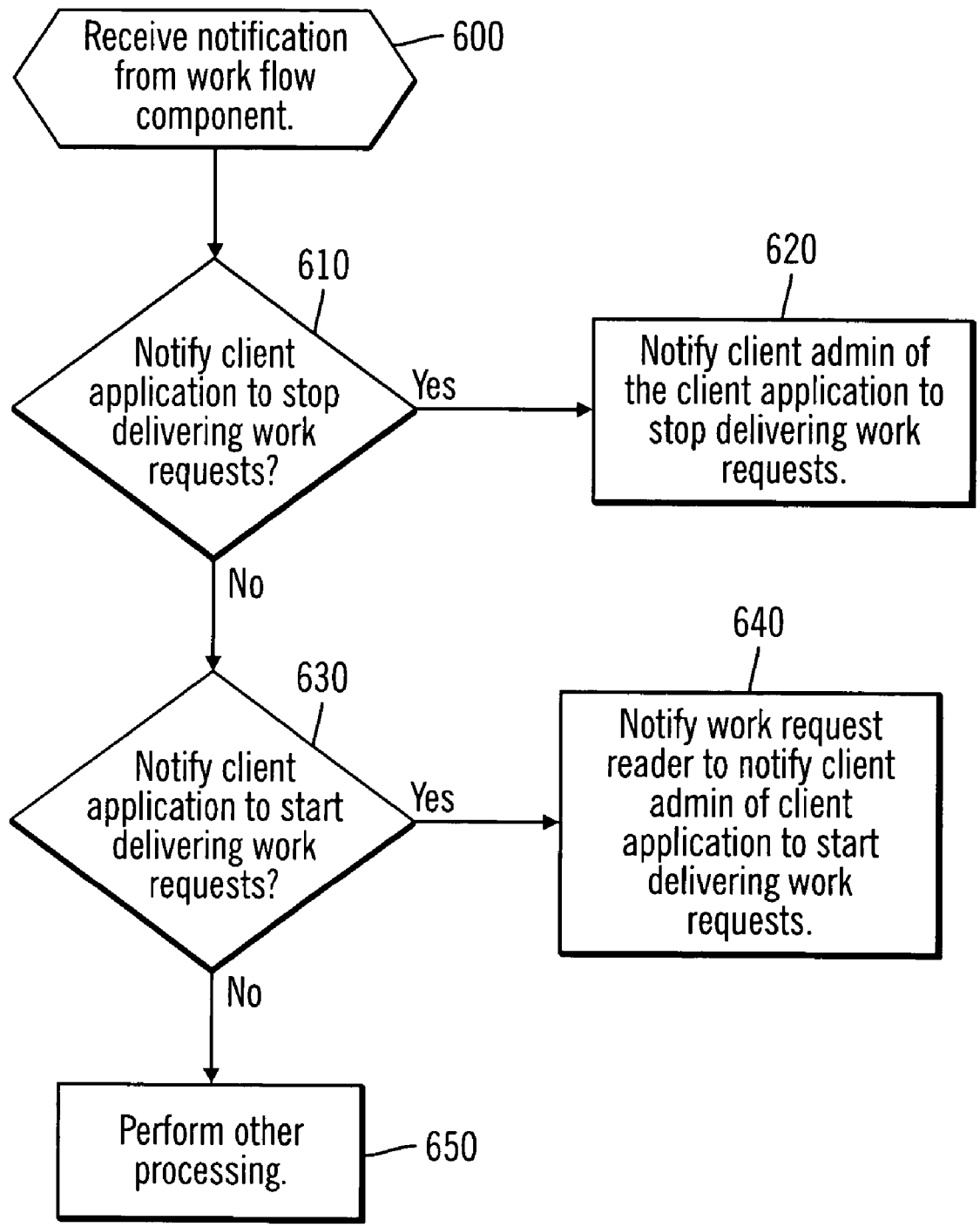
FIG. 6 illustrates logic implemented in a work request reader in accordance with certain implementations of the invention.

FIG. 6 illustrates logic implemented in a work request reader 130 in accordance with certain implementations of the invention. Control begins at block 600 with the work request reader 130 receiving a notification from the flow control component 138. In block 610, if the notification is to notify a client application 110a ... 110n to stop delivering work requests, processing continues to block 620, otherwise, processing continues to block 630. In block 620, the work request reader 130 notifies the client admin 112a ... 112n of the client application 110a ... 110n to stop delivering work requests.

In block 630, if the notification is to notify a client application 110a ... 110n to start delivering work requests, processing continues to block 640, otherwise, processing continues to block 650. In block 640, the work request reader 130 notifies the client admin 112a ... 112n of the client application 110a ... 110n to start delivering work requests. In block 650, other processing may occur. For example, if a notification that the work request reader 130 is not able to process is received, error processing may occur.

Thus, in cases in which a client application 110a ... 110n has been designed such that the client application 110a ... 110n cannot be controlled (e.g., throttled) or cannot receive communications from, for example, business processes 132, it is still desirable to control the in-memory structures 140 so that they do not overflow and work requests are not discarded in the case of an overflow state. Therefore, implementations of the invention prevent the in-memory structures 140 from overflowing and avoid discarding work requests by allowing for work requests received for an in-memory structure that is full to be stored in a separate work request overflow structure 184. The work requests in the work request overflow structure 184 may be redelivered in proper order back to the in-memory structure 140 to be retrieved by the associated business process.

Figure 7:
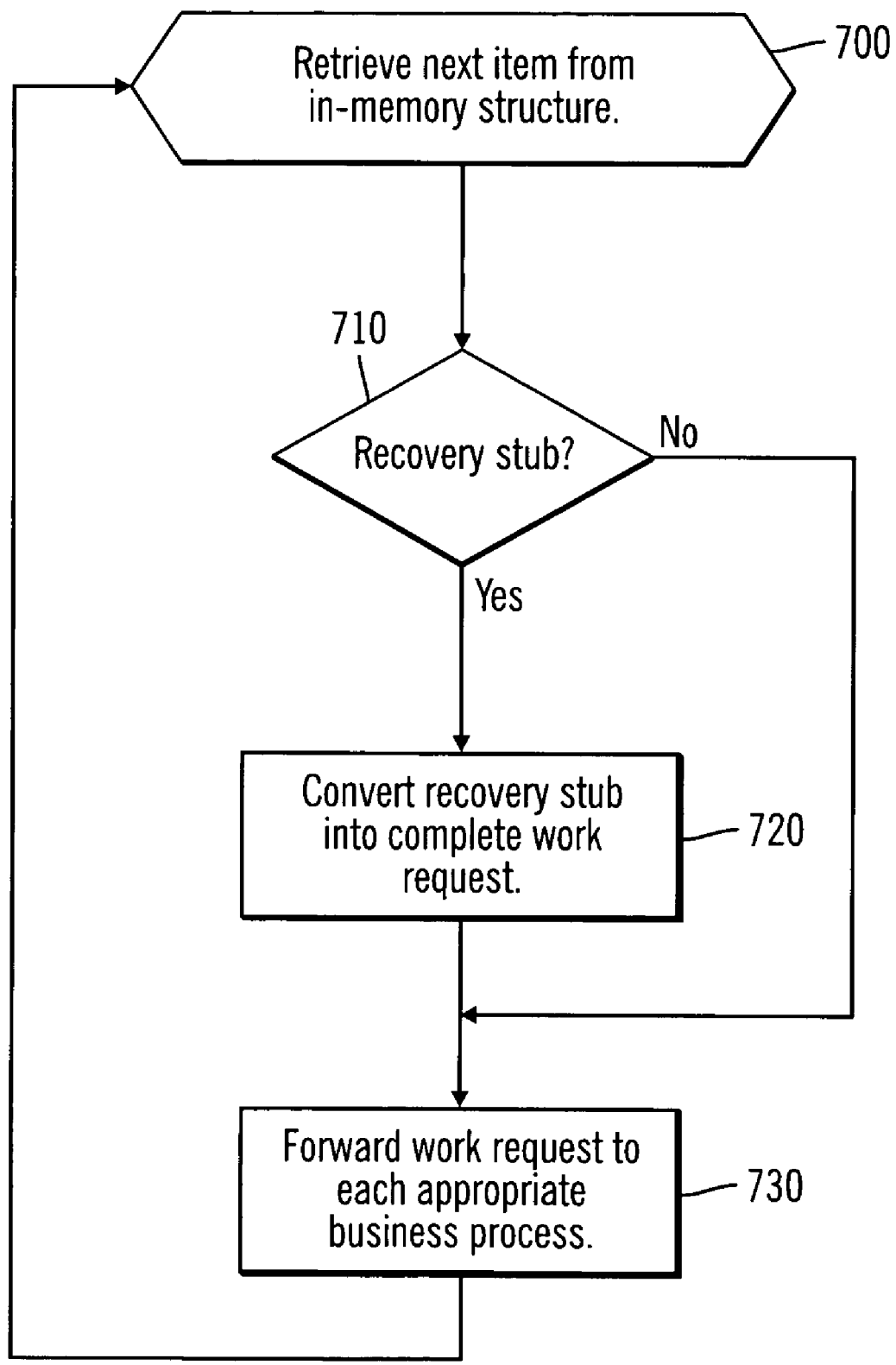
FIG. 7 illustrates logic implemented in a work request reader for processing recovery stubs and work requests in accordance with certain implementations of the invention.

FIG. 7 illustrates logic implemented in a work request reader for processing recovery stubs and work requests in accordance with certain implementations of the invention. Control begins at block 700 with the structure processor 136 retrieving a next item from an in-memory structure 140, starting with a first item. In block 710, the structure processor 136 determines whether the item is a recovery stub. If so, processing continues to block 720, otherwise, processing continues to block 730. In block 720, the structure processor 136 converts the recovery stub into a complete work request by retrieving the complete work request for which the recover stub was created from a transport structure 182. In certain implementations, the work request ordering identifier may be used to locate the complete work request in the transport structure 182. In block 730, the structure processor 136 forwards the complete work request to a business process 132. In certain alternative implementations, the structure processor 136 is called by the business process 132 to retrieve a work request.

IBM, DB2, OS/390, UDB, and Informix are registered trademarks or common law marks of International Business Machines Corporation in the United States and/or other countries. JAVA® is a registered trademark or common law mark of Sun Microsystems.

Additional Implementation Details

The described techniques for buffering work requests may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), hardware component, etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, 3A, 3B, 4A, and 5-7 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, 3A, 3B, 4A, and 5-7 may be implemented in software, hardware, programmable and non-programmable gate array logic or in some combination of hardware, software, or gate array logic.

Figure 8:
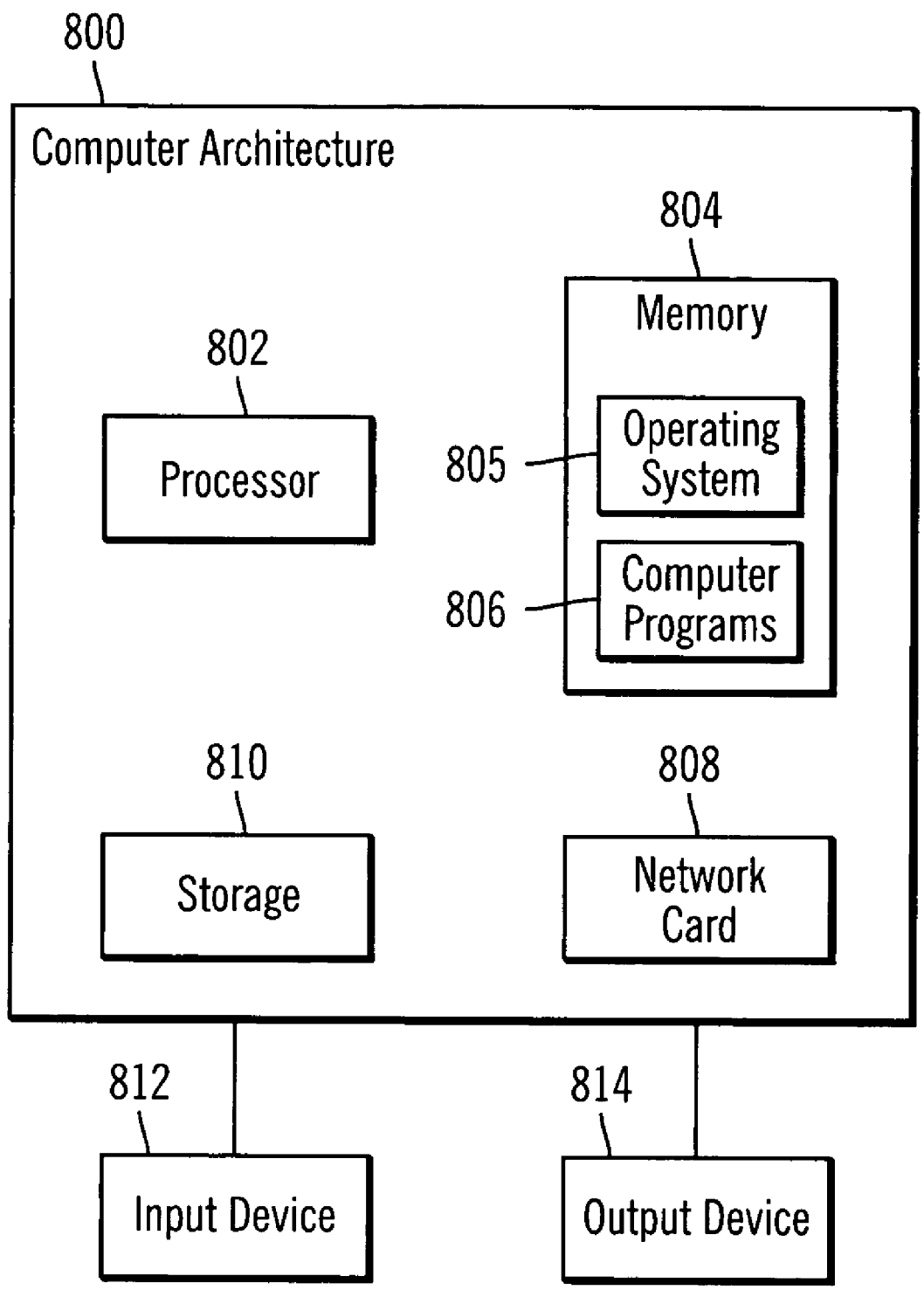
FIG. 8 illustrates an architecture of a computer system that may be used in accordance with certain implementations of the invention.

FIG. 8 illustrates an architecture 800 of a computer system that may be used in accordance with certain implementations of the invention. Client computer 100 and/or server computer 120 may implement computer architecture 800. The computer architecture 800 may implement a processor 802 (e.g., a microprocessor), a memory 804 (e.g., a volatile memory device), and storage 810 (e.g., a non-volatile storage area, such as magnetic disk drives, optical disk drives, a tape drive, etc.). An operating system 805 may execute in memory 804. The storage 810 may comprise an internal storage device or an attached or network accessible storage. Computer programs 806 in storage 810 may be loaded into the memory 804 and executed by the processor 802 in a manner known in the art. The architecture further includes a network card 808 to enable communication with a network. An input device 812 is used to provide user input to the processor 802, and may include a keyboard, mouse, pen-stylus, microphone, touch sensitive display screen, or any other activation or input mechanism known in the art. An output device 814 is capable of rendering information from the processor 802, or other component, such as a display monitor, printer, storage, etc. The computer architecture 800 of the computer systems may include fewer components than illustrated, additional components not illustrated herein, or some combination of the components illustrated and additional components.

The computer architecture 800 may comprise any computing device known in the art, such as a mainframe, server, personal computer, workstation, laptop, handheld computer, telephony device, network appliance, virtualization device, storage controller, etc. Any processor 802 and operating system 805 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for buffering work requests, comprising:
   determining that a work request is about to be placed into an in-memory structure for a business process, wherein the work request includes a work request ordering identifier that indicates an order in which the work request was received, a structure identifier that provides access to the work request stored in one or more transport structures, and data;
   determining whether the in-memory structure is capable of storing the work request and whether one or more work request ordering identifiers are stored in an overflow structure for the business process;
   in response to determining that either the in-memory structure is not capable of storing the work request or one or more work request ordering identifiers are stored in the overflow structure for the business process, storing the work request ordering identifier for the work request into the overflow structure for the business process, wherein work requests for at least one other business process that is not in an overflow state and does not have any work request ordering identifiers stored in another overflow structure for that business process are capable of being stored in an in-memory structure for that business process without interruption; and in response to determining that the in-memory structure is subsequently capable of storing the work request having the work request ordering identifier that was stored in the overflow structure, storing the work request into the in-memory structure for the business process based on the work request ordering identifier stored in the overflow structure by;

determining that a different work request has been removed from the in-memory structure;

generating a recovery stub for the work request ordering identifier for the work request, wherein the recovery stub includes the work request ordering identifier and the structure identifier that provides access to the work request including data stored in the one or more transport structures; and storing the recovery stub into the in-memory structure.

2. The method of claim 1, wherein the in-memory structure is not capable of storing the work request when a maximum limit of work requests has been reached.

3. The method of claim 2, wherein there are multiple in-memory structures and further comprising:

determining that the maximum limit has been reached for a predetermined number of the multiple in-memory structures; and sending one or more notifications to one or more client applications that additional work requests are not to be sent.

4. The method of claim 1, wherein the in-memory structure is not capable of storing the work request when one or more work request ordering identifiers reside in the overflow structure.

5. The method of claim 1, wherein a blocking type is associated with the in-memory structure and further comprising:

when the in-memory structure is not capable of storing the work request,
if the blocking type is set to non-blocking, storing the work request ordering identifier into the overflow structure; and
if the blocking type is set to blocking, sending a notification that additional work requests are not to be sent.

6. The method of claim 1, wherein the work request is sent from a publisher to a subscriber.

7. The method of claim 6, wherein the subscriber retrieves the work request from the in-memory structure.

* * * * *